April 16, 1929.  S. WILEY, JR  1,709,644
LIGHT FOR AIRCRAFT
Filed Nov. 16, 1927  2 Sheets-Sheet 1
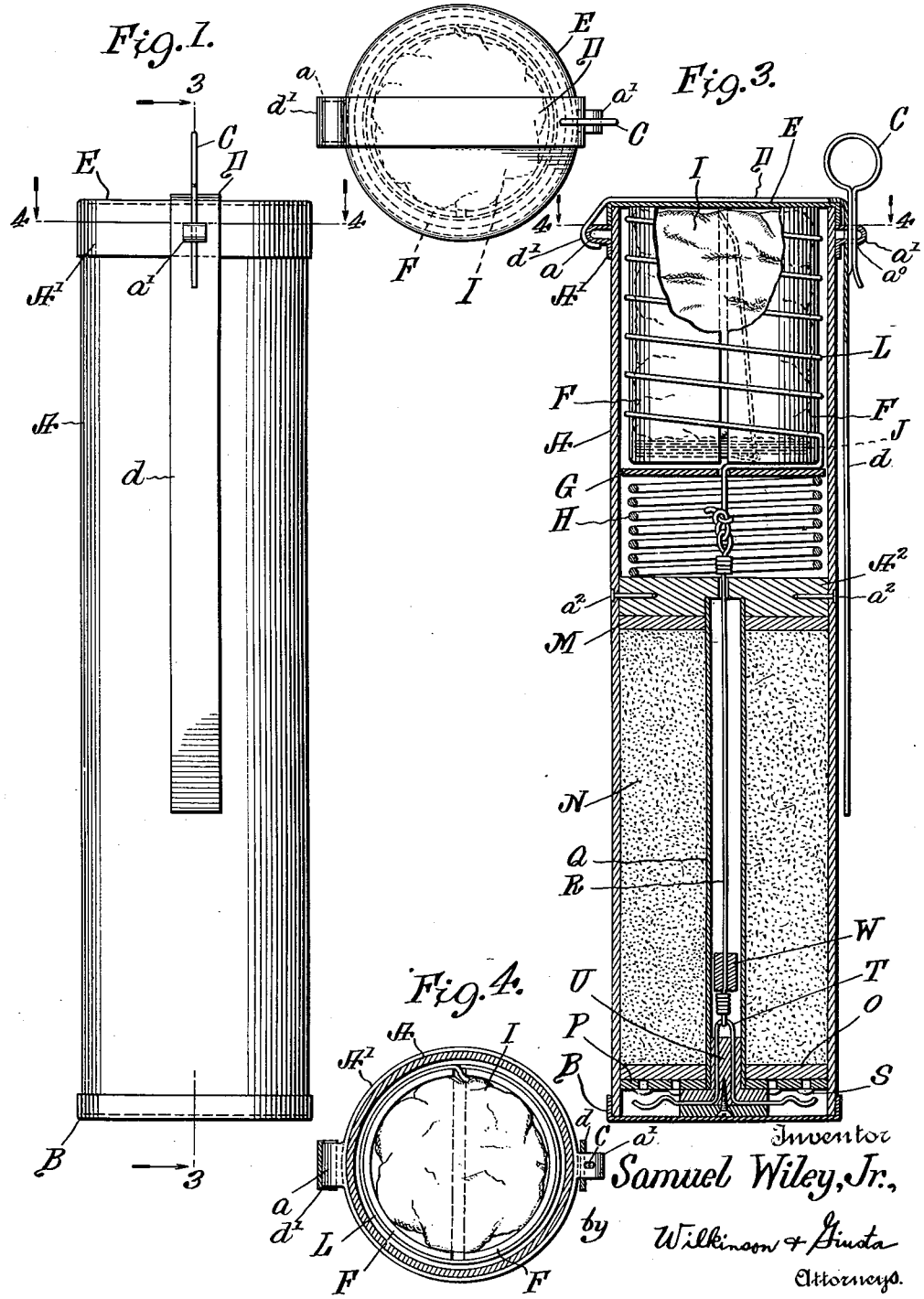
Inventor
Samuel Wiley, Jr.,
by Wilkinson & Giusta
Attorneys.

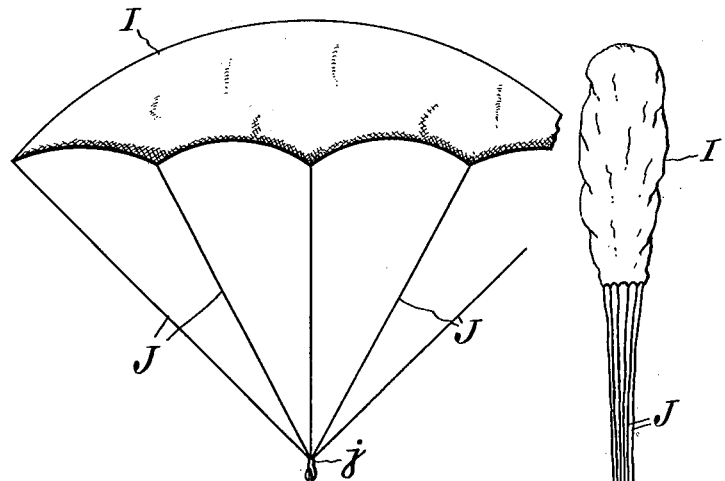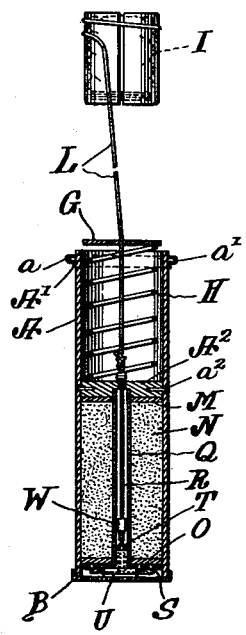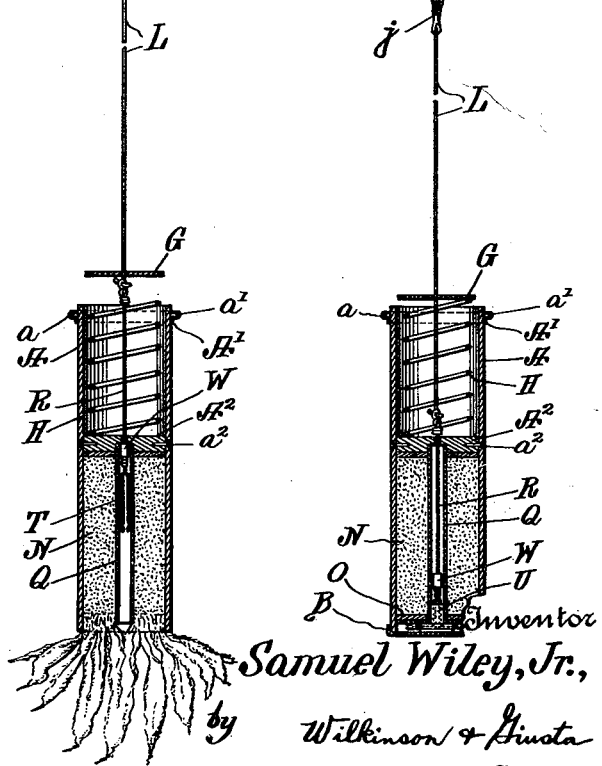

Patented Apr. 16, 1929.

1,709,644

UNITED STATES PATENT OFFICE.

SAMUEL WILEY, JR., OF METUCHEN, NEW JERSEY.

LIGHT FOR AIRCRAFT.

Application filed November 16, 1927. Serial No. 233,676.

My present invention relates to improvements in lights intended to be dropped from aircrafts either for illuminating the land or water over which the aircraft is passing or for signalling purposes.

It is intended to provide a light which may be safely carried and conveniently dropped when desired, and which when released or dropped from the aircraft will fall slowly through the air, illuminating the terrain, and burning for some little time. My present invention is intended more particularly to provide improvements in the construction and operation of the devices shown in my Patent
#1,319,636 for an illuminating aero bomb granted October 21, 1919, and the U. S. Patents granted to Samuel Wiley, Sr. Numbers 1,588,639 and 1,589,277, both dated June 15, 1926, and both entitled improvements in Emergency landing flares.

My present invention will be more fully understood after reference to the accompanying drawings in which Figure 1 is a side elevation of the closed container in which the complete apparatus is stored.

Figure 2 is a plan view of the container shown in Figure 1.

Figure 3 shows a section along the lines 3—3 of Figure 1 and looking in the direction of the arrows.

Figure 4 shows a section along the line 4—4 in Figure 3 and looking down.

Figure 5 shows a central vertical section through the container after the casing containing the parachute has been sprung outward, and before the line connecting the parachute with the light has been entirely distended.

Figure 6 shows a later stage of the operation of the light after the parachute container has been released and fallen away from the parachute, but before the parachute has been distended or the primer operated, and Figure 7 shows the parachute distended and the light burning from the bottom after the illuminant has been ignited by the operation of the friction fuse.

A represents a casing preferably cylindrical in form and made of metal or papier-mâché, water-proofed, or other suitable material, which is normally closed at the bottom by a cap B, which may be either of light metal to be blown off or of water-proof papier-mâché to be burned off or blown off after the fuse is operated. The upper part of this container A is provided with a reinforce ring A', having ears $a$ and $a'$ projecting therefrom, shown most clearly in Figure 4. The ear $a'$ is perforated at $a^0$ to receive the latch pin C which holds the arm $d$ of the resilient clamp-piece D in engagement with said loop $a'$. The opposite end of this clamp-piece is hook-shaped as at $d'$ to engage the ear $a$ of the ring A'. Mounted beneath this clamp-piece D and closing the upper end of the container A is the cup-shaped cap E which fits loosely over the upper end of the container above the parachute case. This parachute case is made of several pieces, preferably of two semi-cylindrical shells, F, between which the parachute is folded up; and the line connecting the parachute with the light is wound around these two shells, if a delayed action in igniting the illuminant is desired. Or the line connecting the parachute and the light can be folded inside, above or below the semi-cylindrical shells, and when the parachute is ejected these shells will fall away immediately causing the light to be ignited instantaneously. In either case a package is formed which can be slipped into the upper end of the container above the movable disc, G, which fits loosely in the container, A, and is normally pressed upwards by the coil spring H, shown most clearly in Figure 3. The parachute I is shown in folded form as held between the shells F in Figures 3 and 5, and released from the shells in Figure 6, and distended in Figure 7. This parachute is provided with the usual stays J fastened together as at $j$ and connected by the line L to the fuse arrangement below, as will be hereinafter described.

Below the chamber containing the parachute and the coil spring H, the container A is provided with a partition $A^2$, which forms the upper end of the composition chamber, and also serves as an abutment for the lower end of the coil spring. This partition $A^2$ is preferably in the form of a wooden disc which may be held in place by nails or tacks $a^2$. In order to make a tight joint below this partition, I may provide a water-proof disc M beneath which is the inflammable composition N, and beneath this composition is a layer of igniting material O, above the perforated bottom P.

Passing up through the composition chamber is a tube Q through which passes the rod or wire R connected to the friction or mechanically operated primer S. The upper end of this rod or wire R is connected to the line L. The friction primer S, may be of any suitable construction and is provided with a looped wire T, which fits in the block U and which wire when jerked through said block will cause the primer to ignite the composition N, and will blow or burn off the bottom of the container and ignite the light composition contained in the lower part of the container A.

Near the lower end of the wire R, I provide a stop block W, which slides freely in the tube Q, as shown most clearly in Figure 3. This stop block will normally rest in the position shown in Figures 3, 5 and 6, but when a sudden jerk is given to the parachute line sufficient to tear the wire T from the fuse and from engagement with block U, as will occur when the parachute opens, the stop W is drawn up in the tube P to the positon shown in Figure 7; and after the fuse has been operated, the parachute will be firmly anchored to the container, which will act as a weight, causing the parachute to descend gradually while the light is burning, and thus the terrain will be illuminated for an appreciable period of time.

The lights may be carried in the aircraft in racks, and may be mechanically released therefrom in any convenient way or they may be manually thrown or released. However thrown, the operation subsequent to release will be the same as when thrown by hand, which is as follows:

A container is picked from its rack, the hand grasping it near the central portion, so that the arm $d$ of the clamp-piece D may be securely held against the body of the container A.

The pin C may be withdrawn by engagement with some part of the airplane, but is preferably withdrawn by the other hand of the operator. The pin being withdrawn, the container is thrown overboard, and the coil spring H, forcing the parachute casing upwards, causes the cap E and the clamp-piece D to fly off. As the parachute casing moves upward, relative to the container, the line, L, will straighten out; and when the parachute is fully distended the sudden jerk on the line, L, will tear the wire, T, from its seat in the fuse, thereby igniting the fuse, and by it causing the lower part of the light to be ignited. The light will burn from the bottom upwards, throwing the light rays downwards.

If the delayed action is required, the line L will be wound around the parachute casing; and as the parachute casing moves upward relative to the container, the line S will unwind from the bottom as shown in Figure 5; thus releasing the two semi-cylindrical shells, F. When the shells F are completely released, they will fall away from the parachute, leaving the parts of the device in the positon shown in Figure 6.

The line L will unwind slowly from the parachute casing, thus insuring sufficient time for the parts to acquire considerable velocity in falling before the parachute has any chance to open.

The downward movement of the container and the parachute will cause the parachute to become distended assuming the position shown in Figure 7.

When the parachute becomes distended the sudden jerk on the line L will operate the fuse in the same manner as has been described.

As soon as the stop block W has been drawn to the top of the tube N, it will engage the partition $A^2$, and the container will be anchored to the parachute and the two will settle slowly towards the surface of the earth and illuminate the terrain beneath.

While I have described an embodiment of the invention in its preferred form, it will be obvious that various changes might be made in the construction, combination and arrangement of parts which could be used without departing from the spirit of my invention, and I do not mean to limit the same to such details, except as particularly pointed out in the claims.

Having thus described my invention, what I claim and desire to secure by Letters Patent of the United States is:

1. An aerial light comprising a container provided with an upper and a lower chamber, the lower chamber containing an illuminating composition, a parachute slidably mounted in the upper chamber, means for anchoring the parachute to said container, a spring normally tending to eject the parachute from the container, means for holding the parachute in said container against the action of said spring, means for releasing the parachute from said container, means for temporarily confining the parachute after it has been released from said container, and means actuated by the opening of said parachute for igniting the illuminating composition.

2. An aerial light comprising a container provided with an upper and a lower chamber, the lower chamber containing an illuminating composition, a parachute slidably mounted in the upper chamber, means for anchoring the parachute to said container, a coil spring under compression normally tending to eject the parachute from the container, means for holding the parachute in said container against the action of said spring, means for releasing the parachute from said container, means for temporarily confining the parachute after it has been released from said container, and means actuated by the opening of said parachute for igniting the illuminating composition.

3. An aerial light comprising a container provided with an upper and a lower chamber, the lower chamber containing an illuminating composition, a parachute slidably mounted in the upper chamber, means for anchoring the parachute to said container, a coil spring under compression normally tending to eject the parachute from the container, a removable cap and clamp piece normally holding this parachute against the action of said spring, means for simultaneously releasing the cap and clamp piece when the container is thrown overboard, and means operated by the opening of the parachute for igniting the illuminating composition.

4. An aerial light comprising a container provided with an upper and a lower chamber, the lower chamber containing an illuminating composition, a parachute slidably mounted in the upper chamber, means for anchoring the parachute to said container, a coil spring under compression normally tending to eject the parachute from the container, a removable cap and clamp piece normally holding this parachute against the action of said spring, means for simultaneously releasing the cap and clamp piece when the container is thrown overboard, means for temporarily confining the parachute after it has been released from said container, and means operated by the opening of the parachute for igniting the illuminating composition.

5. An aerial light comprising a container provided with an upper and a lower chamber, the lower chamber containing an illuminating composition, a parachute slidably mounted in the upper chamber, means for anchoring the parachute to said container, a spring normally tending to eject the parachute from the container, a loose cap and clamp piece for holding the parachute in said container against the action of said spring, means for temporarily confining the parachute after it has been released from said container, and means actuated by the opening of said parachute for igniting the illuminating composition.

6. An aerial light comprising a container provided with an upper and a lower chamber, the lower chamber containing an illuminating composition, a parachute casing formed of separate parts slidably mounted in the upper chamber, a parachute mounted in said casing, a line connecting the parachute to said container, said line being wound around said casing, and releasably holding same about the parachute, a coil spring under compression normally tending to eject the parachute from the container, means for holding the parachute in said container against the action of said spring, means for releasing the parachute from said container, and means actuated by the opening of said parachute for igniting the illuminating composition.

7. An aerial light comprising a container provided with an upper and a lower chamber, the lower chamber containing an illuminating composition, a parachute slidably mounted in the upper chamber, means for anchoring the parachute to said container, a coil spring under compression normally tending to eject the parachute from the container, a removable cap and clamp piece normally holding this parachute against the action of said spring, means for simultaneously releasing the cap and clamp piece when the container is thrown overboard, means for delaying the opening of the parachute when released from said container, and means operated by the opening of the parachute for igniting the illuminating composition.

8. An aerial light comprising a container provided with an upper and a lower chamber, the lower chamber containing an illuminating composition, a parachute slidably mounted in the upper chamber, means for anchoring the parachute to said container, means for automatically ejecting said parachute from said container when the container is thrown overboard, means for temporarily confining the parachute after it has been released from said container, and means operated by the opening of the parachute for igniting the illuminating composition.

SAMUEL WILEY, Jr.